(12) United States Patent
Grushko

(10) Patent No.: US 10,120,679 B2
(45) Date of Patent: Nov. 6, 2018

(54) AUTOMATIC IMPORTS AND DEPENDENCIES IN LARGE-SCALE SOURCE CODE REPOSITORIES

(71) Applicant: GOOGLE LLC, Mountain View, CA (US)

(72) Inventor: Carmi Grushko, New York, NY (US)

(73) Assignee: Google LLC, Mountain View, CA (US)

( * ) Notice: Subject to any disclaimer, the term of this patent is extended or adjusted under 35 U.S.C. 154(b) by 290 days.

(21) Appl. No.: 14/796,695

(22) Filed: Jul. 10, 2015

(65) Prior Publication Data
US 2017/0010888 A1    Jan. 12, 2017

(51) Int. Cl.
*G06F 8/70*     (2018.01)
*G06F 8/33*     (2018.01)
*G06F 17/30*    (2006.01)
*G06F 3/0482*   (2013.01)

(52) U.S. Cl.
CPC ............. *G06F 8/70* (2013.01); *G06F 3/0482* (2013.01); *G06F 8/33* (2013.01); *G06F 17/3012* (2013.01)

(58) Field of Classification Search
CPC . G06F 3/0482; G06F 8/33; G06F 8/70; G06F 17/3012
See application file for complete search history.

(56) References Cited

U.S. PATENT DOCUMENTS

| | | | | |
|---|---|---|---|---|
| 8,635,204 B1* | 1/2014 | Xie | ............................ | G06F 8/71 |
| | | | | 707/709 |
| 8,972,975 B1* | 3/2015 | Rogers | ....................... | G06F 8/61 |
| | | | | 717/154 |
| 9,244,679 B1* | 1/2016 | Arellano | .................... | G06F 8/71 |
| 2010/0042588 A1* | 2/2010 | Smyros | ............. | G06F 17/30613 |
| | | | | 707/706 |
| 2010/0146481 A1* | 6/2010 | Binder | ..................... | G06F 8/656 |
| | | | | 717/110 |
| 2010/0185669 A1* | 7/2010 | Hall | .......................... | G06F 8/33 |
| | | | | 707/773 |

(Continued)

OTHER PUBLICATIONS

Kuric et al., "Search in Source Code Based on Identifying Popular Fragments," 2013, Lecture Notes in Computer Science book series (LNCS, vol. 7741), pp. 408-419.*

(Continued)

*Primary Examiner* — Thuy Dao
*Assistant Examiner* — Stephen Berman
(74) *Attorney, Agent, or Firm* — McDermott Will & Emery LLP

(57) ABSTRACT

A system and method for finding candidates of qualified names for at least one simple name in a source code file are disclosed. A source code file may be received that has at least one simple name for which a corresponding qualified name is required. The source code file may be parsed to determine the simple names in the file and the qualified names in the file. For the at least one simple name for which a corresponding qualified name is required, a source code graph may be searched to find potential candidate qualified names that correspond to the at least one simple name. Upon receipt of a list of potential candidate qualified names from the source code graph, the list may be outputted to a user in order for the user to choose the appropriate qualified name. Build dependencies may also be chosen for the qualified name.

12 Claims, 4 Drawing Sheets

(56) References Cited

U.S. PATENT DOCUMENTS

| | | | |
|---|---|---|---|
| 2010/0205563 A1* | 8/2010 | Haapsaari | G06F 3/0482 715/825 |
| 2011/0035729 A1 | 2/2011 | Sakhare et al. | |
| 2011/0167404 A1* | 7/2011 | Liu | G06F 8/33 717/106 |
| 2011/0296386 A1* | 12/2011 | Woollen | G06F 8/70 717/124 |
| 2011/0302565 A1* | 12/2011 | Ferris | G06F 8/54 717/163 |
| 2012/0159420 A1* | 6/2012 | Yassin | G06F 11/3672 717/101 |
| 2012/0259822 A1* | 10/2012 | Medgyesi | G06F 9/445 707/693 |
| 2013/0326479 A1* | 12/2013 | Russell | G06F 8/70 717/121 |
| 2014/0359574 A1* | 12/2014 | Beckwith | G06F 8/33 717/113 |
| 2015/0309813 A1* | 10/2015 | Patel | G06F 8/75 703/22 |
| 2016/0026443 A1* | 1/2016 | Ji | G06F 8/48 717/140 |
| 2016/0063062 A1* | 3/2016 | Yahav | G06F 17/30477 707/769 |
| 2016/0117154 A1* | 4/2016 | Przygienda | G06F 8/433 717/152 |
| 2016/0196204 A1* | 7/2016 | Allen | G06F 8/71 717/125 |
| 2017/0003948 A1* | 1/2017 | Iyer | G06F 8/65 |

OTHER PUBLICATIONS

Joel Ossher et al., "Automated dependency resolution for open source software," 2010, 7th IEEE Working Conference on Mining Software Repositories (MSR), pp. 130-140, downloaded from the Internet at <url>:http://ieeexplore.ieee.org.*

Sushil Bajracharya et al., "Sourcerer: An internet-scale software repository," 2009, Proceedings of the 2009 ICSE Workshop on Search-Driven Development-Users, Infrastructure, Tools and Evaluation, pp. 1-4, downloaded from the Internet at <url>:https://dl.acm.org.*

Ryan Hardt et al., "Ant build maintenance with Formiga," 2013, Proceedings of the 1st International Workshop on Release Engineering, pp. 13-16, downloaded from the Internet at <url>:https://dl.acm.org.*

Peter Weissgerber et al., "Identifying Refactorings from Source-Code Changes," 2006, 21st IEEE/ACM International Conference on Automated Software Engineering (ASE'06), pp. 1-10.*

International Search Report & Written Opinion issued in corresponding PCT/US2016/039561 dated Aug. 12, 2016.

* cited by examiner

```
1. import java.util.List;

2. public class classDemo{

3. List theList = new ArrayList();

AUTOMATIC IMPORTS AND DEPENDENCIES IN LARGE-SCALE SOURCE CODE REPOSITORIES

BACKGROUND

Developers often build complex software applications that incorporate external code or libraries. For example, a developer may want to include a list of people in his application. Instead of defining his own list object, the developer may include a list class from an external package. In this example as shown in FIG. 1, the developer may include a list from a standard library in his code, such as "java.util.List." The "java.util.List" is a class of ordered collection that is publically available through the java.util package. Once the list has been imported into a developer's source code file, the developer may simply refer to the list with the simple name, "List," without having to use the full, qualified name "java.util.List" everywhere a list is instantiated or used. For example, on line 3 of FIG. 1, the code refers only to the simple name, "List," and not the qualified name, "java.util.List."

Although the process to import packages, libraries, or external code that defines the qualified names into a source code can be straightforward for small code bases using standard integrated development environments (IDEs), large-scale code bases have too many external dependencies for standard IDEs to efficiently find the appropriate full names, referred to as qualified names, or the appropriate build system constructs for the dependencies.

Conventional systems attempt to find qualified names in real-time by looking at the entire code base and trying to determine the appropriate package, library, or other external code. This process is time-consuming. Large amounts of source code simply cannot be processed in a reasonable time using this approach.

As recognized by the inventor, there should be a way to quickly find candidates of qualified names in order to import the appropriate package, library, or external code for simple name references that exist in source code and the build-system dependencies that provide the qualified names.

SUMMARY

This specification describes technologies relating to finding candidates of qualified names for at least one simple name in a source code file.

In general, one aspect of the subject matter described in this specification can be embodied in a system for finding candidates of qualified names for at least one simple name in a source code file. An example system may include one or more processing devices and one or more storage devices storing instructions that implement an example method. An example method may include: receiving a source code file with at least one simple name for which a corresponding qualified name is required; parsing the source code file to determine the simple names in the file and qualified names in the file; for the at least one simple name for which a corresponding qualified name is required, searching a source code graph to find potential qualified names that correspond to the at least one simple name; and upon receipt of a list of potential candidate qualified names from the source code graph, outputting the list.

These and other embodiments can optionally include one or more of the following features: the list of potential candidate qualified names may be filtered or enriched with additional information prior to outputting the list; build dependencies and build targets for specific qualified names may be determined once a qualified name is chosen; the list of potential candidate qualified names may be filtered based on a number of times a qualified name of a particular type has been used by other source code files prior to outputting the list; the list may be ranked based on the frequency in which a particular qualified name has been used in other parts of a source code repository; if the list only contains one potential qualified name, the name may be automatically chosen as the qualified name without user interaction; an interface may be provided for a user to receive a choice of a qualified name from the list of potential candidate qualified names; filtering may include determining whether a qualified name package is visible from the source code file in which a simple name potentially corresponding to the qualified name is currently being referenced and responsive to determining that the qualified name package is visible from the source code file, providing the qualified name package's name as a potential candidate qualified name; and filtering may include determining the amount of complication a qualified name package may add to the build process, including the increase in time or resources in order to build the source code file and responsive to determining that the amount of complication a qualified name package adds to the build process is a sustainable amount, adding the qualified name package's name to the list of potential candidate qualified names.

BRIEF DESCRIPTION OF THE DRAWINGS

FIG. 1 is an example of source code including a qualified name and a simple name.

DETAILED DESCRIPTION

According to an example embodiment, there may be a large-scale graph in a distributed system representing all source code for a certain source code repository or repositories. Source code may be indexed to create the graph. In some embodiments, this graph may exist on a machine or several machines that are remotely accessed by developers so that the graph is not run on an individual developer's machine and can be accessed by multiple developers at the same time. In the simplest form, the graph may be two tables, one mapping simple names to qualified names and a second table mapping qualified names to build system dependencies. By creating and accessing the graph in a distributed system or cloud environment, computations can be cached and reused among developers. In other embodiments, the graph may exist on the developer's own machine.

Figure 2:
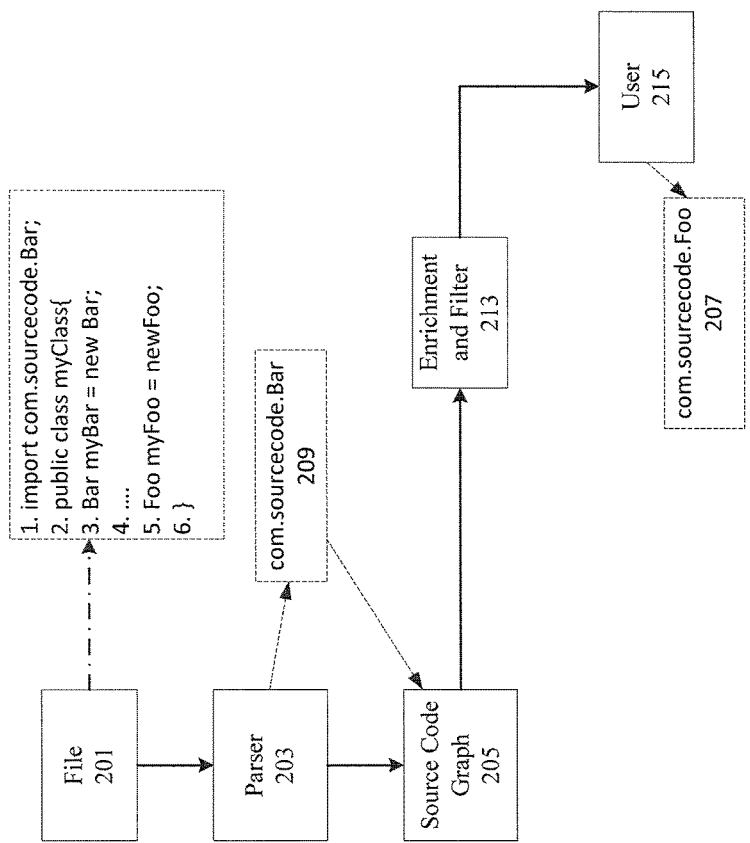
FIG. 2 is a block diagram illustrating an example system for determining qualified names for simple names in a source code file.

As shown in FIG. 2, there are two simple names in an example source code file (201), "Bar" on line 3 and "Foo" on line 5. The qualified name for "Bar" is provided in the code as "com.sourcecode.Bar" on line 1. However, the qualified name for "Foo" is not provided.

In an example system, an integrated development environment (IDE) running on a developer's machine may have a parser (203) that may provide a list of simple names which are used in a particular source code file. The parser (203)

may also provide a list of qualified names in the source code file. For the source code file shown in FIG. 2, the list of simple names may be: [Foo, Bar]. The list of qualified names may be: [com.sourcecode.Bar]. As illustrated, a qualified name corresponding to a simple name may not be provided. In order to find the qualified name and the build-system construct that provides the qualified name for simple names in the source code for which the corresponding qualified name is not provided, the source code graph (205) may be queried for possible expansions of the simple name into a qualified name. In the given example, the source code graph (205) may be queried for the qualified name for "Foo" and build dependencies associated with "Foo." If the qualified name is provided as an import such as "Bar" in this example, the build-system dependency may or may not be present. Therefore, the source code graph (205) may also be queried for the build-system dependencies even when the fully qualified name is provided in the source code.

For example, when looking for "Foo," the search of the source code graph (205) may match classes and build system artifacts that contain the name "Foo." In some embodiments, results may be filtered by how a simple name is used in code. For example, if a certain method of "Foo" is called, fully-qualified potential candidates for completion that do not contain the method may be filtered out of the potential candidate list. The query may then return a list of imports and build-system dependencies. There are various ways to order and filter this list as one of ordinary skill in the art can appreciate.

The source code graph (205) may be traversed to obtain information such as the build system dependencies for simple names found in the files. For example, the source code graph may be able to provide the targets for the dependencies to the qualified name for the simple name "Foo" so that the source code can be compiled into object files.

The list of potential qualified names for a given simple name obtained by traversing the source code graph (205) may be enriched with other data and further filtered (213). Enrichment data may include: the number of times the qualified name is used in the repository (to allow for ranking); whether the qualified-name is marked as deprecated, and if so what qualified-name should be used instead; whether the qualified-name package is visible from the source code in which it is currently being referenced (some classes may be intentionally restricted to certain software packages); and the amount of complication this qualified-name may add to the build process including the increase in time and/or resources in order to build the source code. The list may be filtered, for example, based on the number of times a qualified name of a particular type has been used by other source code files. Filtering may also include removing all non-visible classes or removing all classes that would not fit within the specific context in the code. For example, "Foo" may call a specific method in a source code file so all matching "Foo" libraries that do not have this method may be filtered out of the potential candidate list. When returning a list of possible candidates for completions and dependencies to a user (215) for consideration, an example system may rank returned results based on the frequency in which a particular qualified name has been used by other developers in other parts of the source code repository.

In some embodiments, heavily-used qualified names are the names most likely to be used by developers in their source code files. Among other rankings, names may also be ranked by whether they are visible to the source code file in which they are being considered to be used. whether the class the name represents has a method being used in the source code file. and whether classes are deprecated. Classes that are deprecated may be demoted in name ranking. A user (215) may then be shown the enriched, filtered list of potential qualified name candidates for a specific simple name reference in the code and choose the most appropriate package, library, or other external code source for the simple named object. Once the user (215) chooses the correct qualified name for the simple name in the source code from the candidates of qualified names, the chosen qualified names may then be sent to the source graph (205) again to acquire information about the build-system dependencies in order to manipulate build rule dependencies and build targets for specific qualified names. In some embodiments, the list of potential candidates for completion and build-system dependencies may be filtered and for the query to only return the import and build-system dependencies that are the most likely matches.

As shown in FIG. 2, once the unique qualified names (207, 209) have been found in the source code graph (205) or parsed from the file itself (203) and matched with the simple names used in the source code file (201), the qualified names may be added/imported into the file (201). The source graph may be re-generated periodically in order to determine which classes/build dependencies are used most often.

Figure 3:
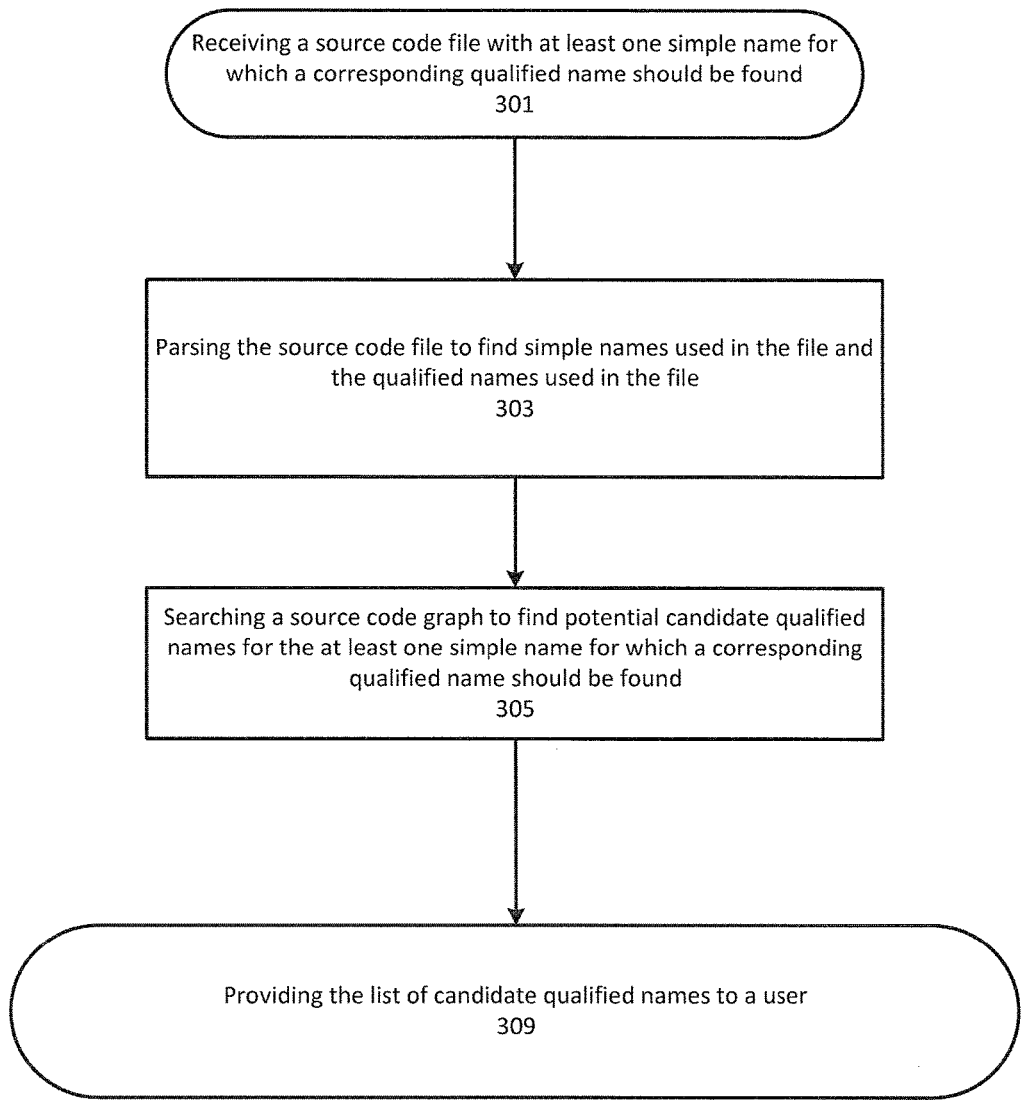
FIG. 3 is an example method for finding candidates of qualified names for at least one simple name in a source code file.

An example method as shown in FIG. 3 begins with receiving a source code file with at least one simple name for which a corresponding qualified name should be found (or is required) (301). The source code file may then be parsed to find a list of the simple names used in the file and another list of all the qualified names in the file (303). For the at least one simple name for which a corresponding qualified name should be found, the graph of all source code may be searched to find potential candidate qualified names for the simple name (305). In some embodiments, the candidate list of names may be filtered or enriched with additional information. The list may be provided to a user for the user to choose the appropriate qualified name for a given simple name (309). In some embodiments, if there is only one candidate qualified name, a user may not need to choose the qualified name and the qualified name may be chosen automatically. In other embodiments, if there is only one candidate qualified name, a user may just confirm that the qualified name is the appropriate match for the simple name. Once the qualified name is chosen, an example method may determine build dependencies and build targets for specific qualified names. The qualified names matching the simple names in the source code file may be added to the source file. Then, the source code graph may be re-generated and information pertaining to simple name/qualified name/build dependency frequency may be used in future analysis to find qualified names and build dependencies.

Figure 4:
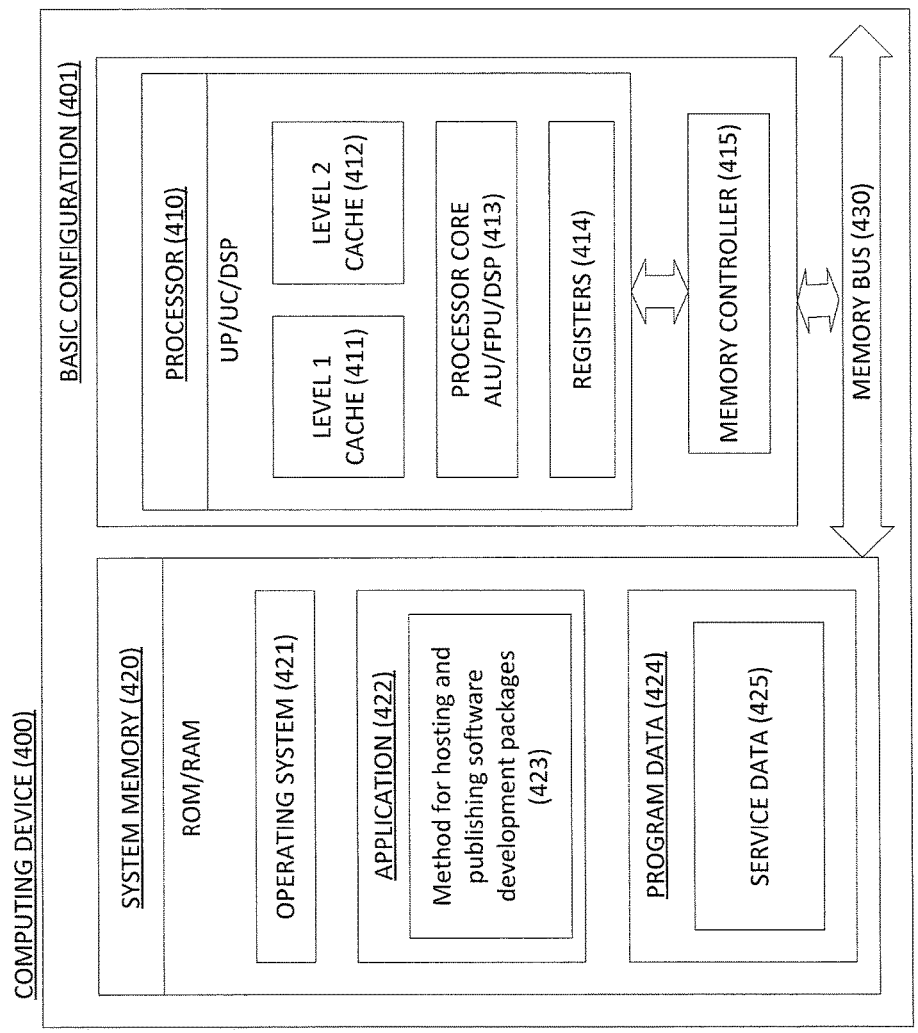
FIG. 4 is a block diagram illustrating an example computing device.

FIG. 4 is a high-level block diagram of an example computer (400) that is arranged for hosting and publishing software packages. In a very basic configuration (401), the computing device (400) typically includes one or more processors (410) and system memory (420). A memory bus (430) can be used for communicating between the processor (410) and the system memory (420).

Depending on the desired configuration, the processor (410) can be of any type including but not limited to a microprocessor (IP), a microcontroller (pC), a digital signal processor (DSP), or any combination thereof The processor (410) can include one more levels of caching, such as a level one cache (411) and a level two cache (412), a processor core (413), and registers (414). The processor core (413) can include an arithmetic logic unit (ALU), a floating point unit (FPU), a digital signal processing core (DSP Core), or any combination thereof A memory controller (416) can also be used with the processor (410), or in some implementations the memory controller (415) can be an internal part of the processor (410).

Depending on the desired configuration, the system memory (420) can be of any type including but not limited to volatile memory (such as RAM), non-volatile memory (such as ROM, flash memory, etc.) or any combination thereof. System memory (420) typically includes an operating system (421), one or more applications (422), and program data (424). The application (422) may include a method for hosting and publishing software packages. Program Data (424) includes storing instructions that, when executed by the one or more processing devices, implement a method for hosting and publishing software packages. (423). In some embodiments, the application (422) can be arranged to operate with program data (424) on an operating system (421).

The computing device (400) can have additional features or functionality, and additional interfaces to facilitate communications between the basic configuration (401) and any required devices and interfaces.

System memory (420) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of the device (400).

The computing device (400) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (400) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for finding candidates of qualified names for at least one simple name in a source code file to be compiled, the method comprising:
    receiving a source code file to be compiled, the source code file including at least one simple name for which a corresponding qualified name is required by a compiler;
    parsing the source code file to determine the at least one simple name for which a corresponding qualified name is required and qualified names in the source code file;
    for the at least one simple name for which a corresponding qualified name is required, searching a source code graph to find potential candidate qualified names that correspond to the at least one simple name;
    upon receipt of a list of potential candidate qualified names from the source code graph, enriching the list of potential candidate qualified names with additional information, wherein enriching the list of potential candidate qualified names includes:
        determining an increase in time to build the source code that a qualified name package, corresponding to a potential candidate qualified name included in the list of potential candidate qualified names, adds to a build process;
        responsive to determining that the increase in time to build the source code does not exceed a threshold value, adding the qualified name package's name to the list of potential candidate qualified names;
        outputting the list;
    determining build dependencies and build targets for specific qualified names once a qualified name is chosen from the list of potential candidate qualified names; and
    compiling the source code based on the determined build dependencies and build targets.

2. The computer-implemented method of claim 1, wherein enriching the list includes:

enriching the list to include a number of times a potential candidate qualified name of a particular type has been used by other source code files prior to outputting the list.

3. The computer-implemented method of claim 1, wherein enriching the list includes:
ranking the list based on a frequency in which a particular potential candidate qualified name has been used in other parts of a source code repository.

4. The computer-implemented method of claim 1, further comprising:
automatically choosing the qualified name without user interaction if the list only contains one potential qualified name.

5. The computer-implemented method of claim 1, further comprising:
providing an interface to receive a choice of a qualified name from the list of potential candidate qualified names.

6. The computer-implemented method of claim 1, wherein enriching the list includes:
determining whether the qualified name package is visible from the source code file in which a simple name potentially corresponding to the qualified name package is currently being referenced; and
responsive to determining that the qualified name package is visible from the source code file, providing the qualified name package's name as a potential candidate qualified name.

7. A system for finding candidates of qualified names for at least one simple name in a source code file to be compiled, the system comprising:
one or more processing devices and
one or more storage devices storing instructions that, when executed by the one or more processing devices, cause the one or more processing devices to:
receive a source code file to be compiled, the source code file including at least one simple name for which a corresponding qualified name is required by a compiler;
parse the source code file to determine the at least one simple name for which a corresponding qualified name is required and qualified names in the source code file;
for the at least one simple name for which a corresponding qualified name is required, searching a source code graph to find potential qualified names that correspond to the at least one simple name;
upon receipt of a list of potential candidate qualified names from the source code graph, enriching the list of potential candidate qualified names with additional information, wherein enriching the list of potential candidate qualified names includes:
determining an increase in time to build the source code that a qualified name package, corresponding to a potential candidate qualified name included in the list of potential candidate qualified names, adds to a build process;
responsive to determining that the increase in time to build the source code does not exceed a threshold value, adding the qualified name package's name to the list of potential candidate qualified names;
outputting the list;
determining build dependencies and build targets for specific qualified names once a qualified name is chosen from the list of potential candidate qualified names; and
compiling the source code based on the determined build dependencies and build targets.

8. The system of claim 7, wherein enriching the list includes:
enriching the list to include a number of times a potential candidate qualified name of a particular type has been used by other source code files prior to outputting the list.

9. The system of claim 7, wherein enriching the list includes:
ranking the list based on a frequency in which a particular potential candidate qualified name has been used in other parts of a source code repository.

10. The system of claim 7, further comprising:
automatically choosing the qualified name without user interaction if the list only contains one potential qualified name.

11. The system of claim 7, further comprising:
providing an interface to receive a choice of a qualified name from the list of potential candidate qualified names.

12. The system of claim 7, wherein enriching the list includes:
determining whether the qualified name package is visible from the source code file in which a simple name potentially corresponding to the qualified name package is currently being referenced; and
responsive to determining that the qualified name package is visible from the source code file, providing the qualified name package's name as a potential candidate qualified name.

* * * * *